US012681807B2

(12) United States Patent (10) Patent No.: US 12,681,807 B2

Um (45) Date of Patent: Jul. 14, 2026

(54) STORAGE DEVICE THAT BACKS UP DATA TO PAGE BUFFER IN LOW POWER MODE AND METHOD FOR OPERATING THE SAME

(71) Applicant: SK hynix Inc., Icheon-si (KR)

(72) Inventor: Gi Pyo Um, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 35 days.

(21) Appl. No.: 18/820,783

(22) Filed: Aug. 30, 2024

(65) Prior Publication Data

US 2025/0328425 A1 Oct. 23, 2025

(30) Foreign Application Priority Data

Apr. 18, 2024 (KR) ........................ 10-2024-0051981

(51) Int. Cl.
*G06F 1/00* (2006.01)
*G06F 11/1446* (2026.01)
*G06F 1/3203* (2019.01)

(52) U.S. Cl.
CPC ...... *G06F 11/1451* (2013.01); *G06F 11/1469* (2013.01); *G06F 1/3203* (2013.01)

(58) Field of Classification Search
CPC ............. G06F 11/1451; G06F 11/1469; G06F 3/0614; G06F 3/0604; G06F 3/0625; G06F 3/0658; G06F 3/0659; G06F 2212/1016; G06F 2212/1028; G06F 2212/1032; G06F 2212/7207; Y02D 10/00
USPC ......................................................... 713/300
See application file for complete search history.

(56) References Cited

U.S. PATENT DOCUMENTS

| | | | | |
|---|---|---|---|---|
| 2011/0289263 A1* | 11/2011 | McWilliams | ....... | G06F 12/0802 |
| | | | | 711/E12.008 |
| 2016/0116972 A1* | 4/2016 | Shin | ...................... | G06F 3/0625 |
| | | | | 711/162 |
| 2016/0188414 A1* | 6/2016 | Jayakumar | .......... | G06F 12/0868 |
| | | | | 711/103 |
| 2019/0179749 A1* | 6/2019 | Lee | ...................... | G06F 3/0659 |
| 2020/0233812 A1* | 7/2020 | Oh | ...................... | G06F 12/1009 |
| 2020/0363983 A1* | 11/2020 | Li | ...................... | G11C 16/0483 |
| 2020/0379679 A1* | 12/2020 | Oh | ........................ | G06F 3/0604 |
| 2021/0042234 A1* | 2/2021 | You | ...................... | G06F 13/1673 |

(Continued)

FOREIGN PATENT DOCUMENTS

| | | |
|---|---|---|
| KR | 20170098802 A | 8/2017 |
| KR | 20220033368 A | 3/2022 |

*Primary Examiner* — Volvick Derose
(74) *Attorney, Agent, or Firm* — Perkins Coie LLP

(57) ABSTRACT

Storage devices and methods are disclosed. In an embodiment, a storage device may include a memory device including a plurality of memory units configured to store data and a plurality of page buffers coupled to the plurality of memory units, respectively, a volatile memory configured to store write data requested by a host, a power control device configured to control power supply to the memory device and the volatile memory and a processing circuit configured to control the memory device based on a command transmitted from the host. The processing circuit backs up the write data to a first page buffer among the plurality of page buffers in response to a low power mode entry command transmitted from the host. The power control device cuts off power supply to the volatile memory after the write data is backed up in the first page buffer.

20 Claims, 10 Drawing Sheets

(56)                    References Cited

U.S. PATENT DOCUMENTS

| | | | |
|---|---|---|---|
| 2022/0075531 A1* | 3/2022 | Hong | G06F 11/1441 |
| 2022/0171707 A1* | 6/2022 | Lee | G06F 12/10 |
| 2022/0300199 A1* | 9/2022 | Buxton | G06F 12/0246 |
| 2023/0154544 A1* | 5/2023 | Cho | H10B 43/27 |
| | | | 365/185.18 |
| 2024/0069751 A1* | 2/2024 | Eun | G06F 3/0619 |
| 2024/0331776 A1* | 10/2024 | Cho | G11C 11/5642 |

* cited by examiner storing write data to a volatile memory ——S1010 receiving a low power mode
entry command from the host ——S1020 backing up the write data to a first page
buffer among a plurality of page buffers ——S1030 cutting off power supplied to the volatile memory after
the write data is backed up in the first page buffer ——S1040

STORAGE DEVICE THAT BACKS UP DATA TO PAGE BUFFER IN LOW POWER MODE AND METHOD FOR OPERATING THE SAME

CROSS-REFERENCE TO RELATED APPLICATION

This patent document claims the priority and benefits of Korean patent application number 10-2024-0051981 filed on Apr. 18, 2024, which is incorporated herein by reference in its entirety.

TECHNICAL FIELD

Various embodiments of the disclosed technology generally relate to a storage device that backs up data to page buffer in low power mode and a method for operating the storage device.

A storage device is a device that stores data based on a request from an external device such as computers and mobile devices such as smart phones and tablet computers.

A storage device may include a memory for storing data therein and a controller for controlling the memory. The memory may be a volatile memory or a non-volatile memory. The controller may receive a command from an external device (e.g., a host), and execute or control operations to read, write, or erase data in the memory included in the storage device based on the received command.

The power consumption of the storage device may vary depending on the mode of the storage device. The mode of the storage device may include active mode, low power mode, and sleep mode. The storage device consumes the most power in active mode, consumes less power in low power mode than active mode, and consumes less power in sleep mode than low power mode.

When the storage device is in a low power mode, power supplied to some of the components included in the storage device may be cut off to reduce power consumption. When the storage device in sleep mode, power to more components may be cut off than when it is in low power mode.

SUMMARY

The disclosed technology can be implemented in some embodiments to provide a storage device and its operating method that can process read requests from a host more quickly.

The disclosed technology can also be implemented in some embodiments to provide a storage device and its operating method that can efficiently use the storage space of the memory device by preventing fragmentation of memory device.

In addition, the disclosed technology can be implemented in some embodiments to provide a storage device that can quickly perform operations for entering and exiting low power mode.

In an embodiment of the disclosed technology, a storage device may include a memory device including a plurality of memory units configured to store data; and a plurality of page buffers coupled to the plurality of memory units, respectively, and configured to temporarily store the data being read from or written to the plurality of memory units; a volatile memory coupled to the memory device and configured to store write data, requested by a host; a power control device coupled to the memory device and the volatile memory and configured to control power supply to the memory device and the volatile memory; and a processing circuit configured to control the memory device and process a command transmitted from the host. The processing circuit may back up the write data to a first page buffer among the plurality of page buffers in response to a low power mode entry command transmitted from the host. And the power control device may cut off power supply to the volatile memory after the write data is backed up in the first page buffer.

In another embodiment of the disclosed technology, an operating method of a storage device may include storing write data requested by a host to be written to a volatile memory; receiving a low power mode entry command from the host; in response to the low power mode entry command, backing up the write data to a first page buffer among a plurality of page buffers corresponding to a plurality of memory units respectively; and cutting off power supply to the volatile memory after the write data is backed up in the first page buffer.

In another embodiment of the disclosed technology, a data storage device may include a memory device including a plurality of memory units configured to store data and a plurality of buffers coupled to the plurality of memory units, respectively, and configured to temporarily store the data being read from or written to the plurality of memory units; a volatile memory coupled to the memory device and configured to store host data transmitted upon request from a host; and a controller coupled to the memory device and the volatile memory and configured to process command transmitted from the host. The controller may back up, in response to a low power mode entry command transmitted from the host, the transmitted host data in the plurality of buffers.

The disclosed technology can be implemented in some embodiments to quickly process read requests from a host, prevent fragmentation of memory device and allow efficient use of the storage space of the memory device, and quickly execute low power mode entry operation and low power mode exit operation.

DETAIL DESCRIPTION

The methods, processes, and/or operations described herein may be performed by code or instructions executed by a computer, processor, controller, or other signal processing device. The computer, processor, controller, or other signal processing device may include those described herein or others in addition to the elements described herein.

Given that the algorithms underlying these methods (or operations of the computer, processor, controller, or other signal processing device) are described in detail, the code or instructions for implementing the operations of these methods may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed by, for example, a computer, processor, microprocessor, controller, or other signal processing device.

Figure 1:
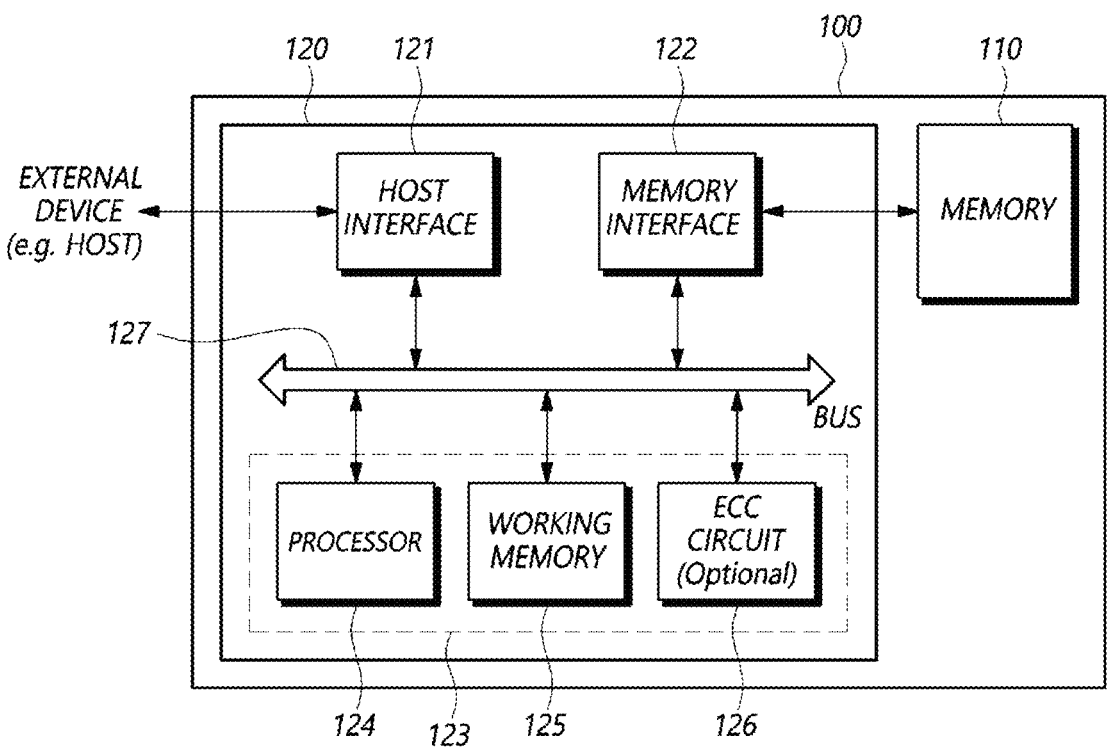
FIG. 1 is a schematic configuration diagram of a storage device based on an embodiment of the disclosed technology.

FIG. 1 is a schematic configuration diagram of a storage device 100 based on an embodiment of the disclosed technology.

Referring to FIG. 1, the storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 based on a request from a device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 based on embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer, which performs a translating function between a logical address requested to the storage device 100 from the host and a physical address of the memory 110; a host interface layer (HIL), which serves to analyze a command requested to the storage device 100 as a storage device from the host and transfer the command to the flash translation layer; and a flash interface layer (FIL), which transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 based on a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g. SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is higher than a reference value, the error detection and correction circuit 126 may determine that a corresponding sector is uncorrectable or a "fail." On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
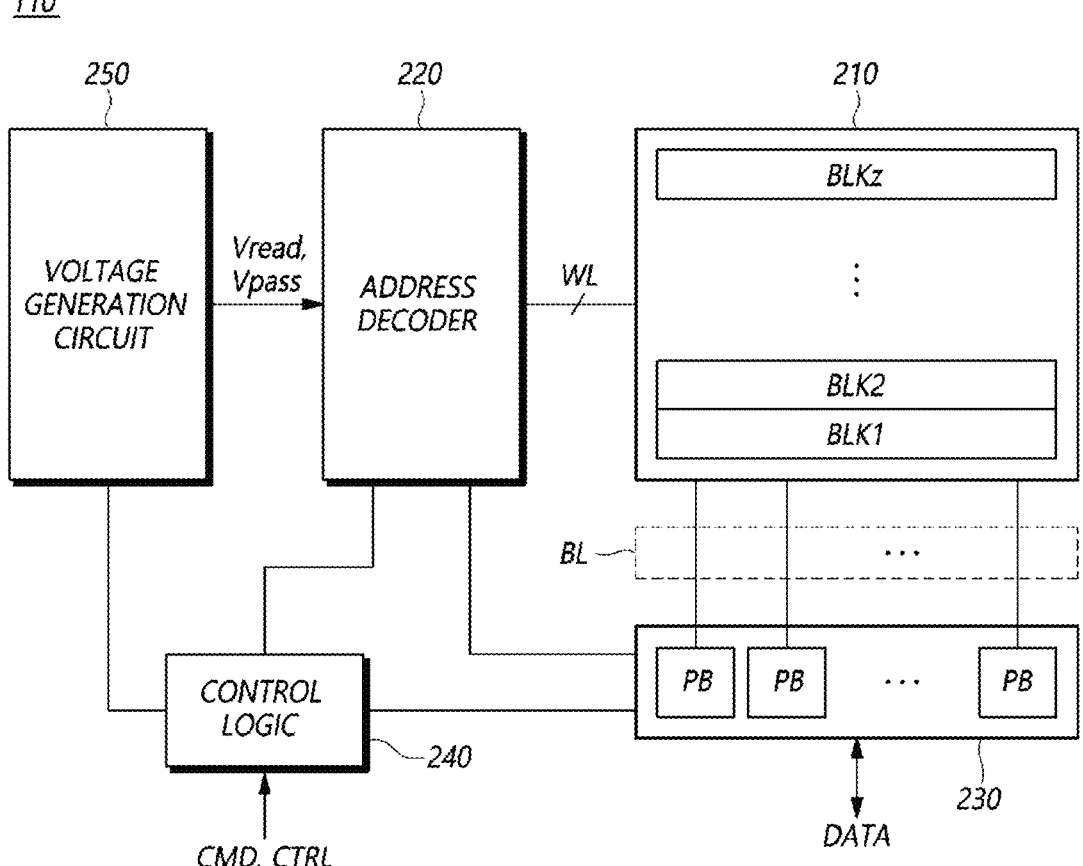
FIG. 2 is a block diagram schematically illustrating a memory of FIG. 1.

FIG. 2 is a block diagram schematically illustrating a memory 110 of FIG. 1.

Referring to FIG. 2, the memory 110 based on an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may hold or latch data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
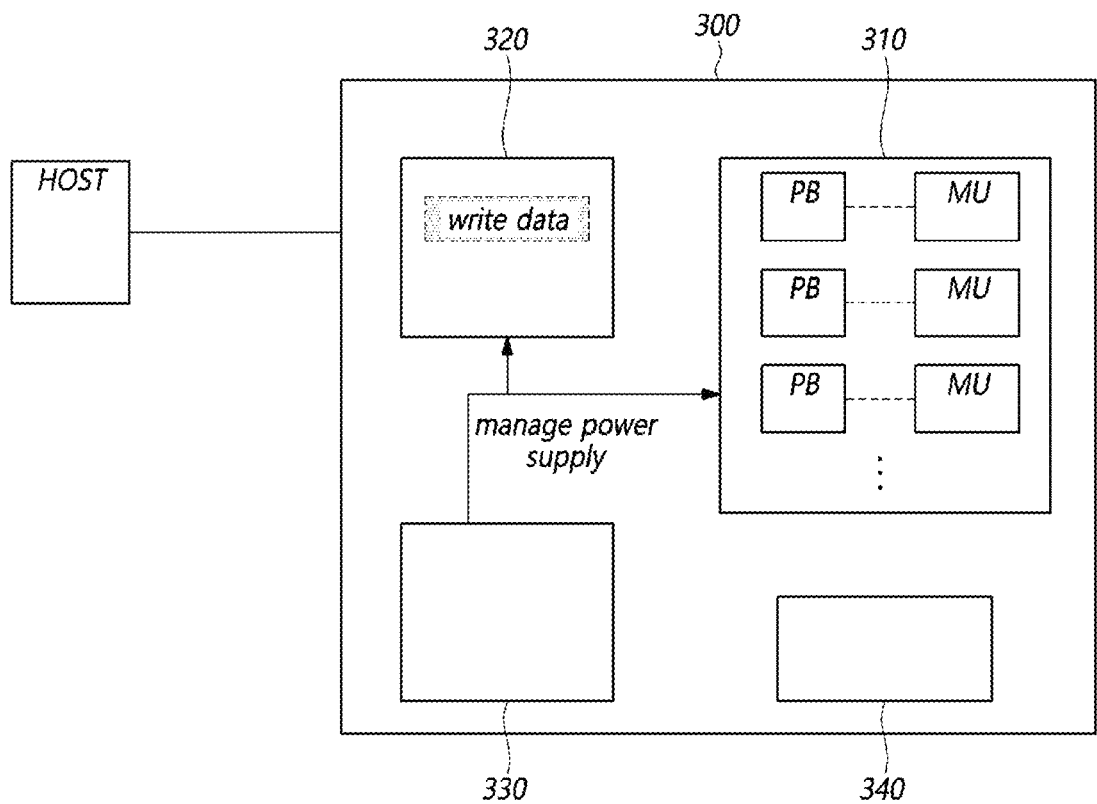
FIG. 3 is a diagram illustrating examples of components of a storage device based on an embodiment of the disclosed technology.

FIG. 3 is a diagram illustrating examples of components of a storage device 300 based on an embodiment of the disclosed technology.

Referring to FIG. 3, the storage device 300 may include a memory device 310, a volatile memory 320, a power control device 330, and a processing circuit 340.

In some implementations, the memory device 310 may include a plurality of memory units MU and a plurality of page buffers PB corresponding to the plurality of memory units MU, respectively.

Each of the plurality of memory units MU may include a plurality of memory cells. Data may be written to the plurality of memory cells included in each memory unit.

Each of the plurality of memory units MU may be configured in various ways. For example, each of the plurality of memory units MU may include one or more pages. In some implementations, the page may indicate the smallest unit of data that can be read from the memory device 310 and written to the memory device 310. As another example, each of the plurality of memory units MU may include one or more memory blocks, and each memory block may include one or more pages.

Each of the plurality of page buffers PB may include latches that can store data. The latches included in each page buffer may be non-volatile latches. Alternatively, data stored in each page buffer may be maintained while power is supplied to the memory device 310.

The size of each of the plurality of page buffers PB may be a multiple of a size of a memory block or page constituting each memory unit MU.

When data is written to a memory unit among the plurality of memory units MU, the memory device 310 may first store data in a page buffer corresponding to the memory unit and then migrate the data stored in the page buffer to the memory unit.

The volatile memory 320 may store write data in response to a request by a host HOST.

In one implementation, the host HOST may request to write the write data directly to the memory device 310 without storing it in the volatile memory 320 temporarily. In another implementation, the host HOST may first request to write the write data in the volatile memory 320 and then request to write it to the memory device 310. In the latter case, the storage device 300 may temporarily store the write data in the volatile memory 320 before storing the write data in the memory device 310.

The size of the write data stored in the volatile memory 320 may be less than a reference size, which is the size of data that can be written at once in the memory device 310. For example, the reference size may be the size of each page buffer described above.

Fragmentation is a condition in which the contents of a single file are stored in different locations rather than in a contiguous space, resulting in inefficient use of storage space. In order to prevent fragmentation of the memory device 310 and efficiently use the storage space of the memory device 310, the storage device 300 may write data of a preset reference size to the memory device 310 at once.

Therefore, when the size of the write data is less than the reference size, the storage device 300 may temporarily store the write data in the volatile memory 320 and then wait for the host HOST to request additional write of data. For example, the storage device 300 may temporarily store the write data in the volatile memory 320 and then wait for the host HOST to request additional write of data until the total size of write data received from the host HOST reaches the preset reference size.

In some implementations, when the host HOST requests to read the write data while the write data is stored in the volatile memory 320, the storage device 300 may access the volatile memory 320 and transmit the write data stored in the volatile memory 320 to the host HOST. For example, when the host HOST requests to read data, the storage device 300 may determine whether the requested data is stored in the volatile memory 320 or in the memory device 310, and if the requested data is stored in the volatile memory 320, the storage device 300 may access the volatile memory 320 and transmit the write data stored in the volatile memory 320 to the host HOST without accessing the memory device 310.

In this case, the storage device 300 may process read request from the host HOST more quickly than accessing the memory device 310 and transmitting the write data stored in the memory device 310 to the host HOST.

The power control device 330 may control power supply to the memory device 310 and the volatile memory 320. The power control device 330 may cut off or maintain power supplied to the memory device 310 and the volatile memory 320.

The processing circuit 340 may process a command transmitted from the host HOST. For example, the processing circuit 340 may interpret the command (e.g., the processing circuit 340 determines what operation the command is requesting) and perform the operation requested by the command. The command may be a read command, a write command, an erase command, a low power mode entry command, or a low power mode exit command, etc.

In some implementations, the processing circuit 340 may control the memory device 310 to perform the operation requested by the command. For example, the processing circuit 340 may read data from the memory device 310 or write data to the memory device 310.

In some embodiments, the processing circuit 340 may control the power control device 330. The processing circuit 340 may transmit a signal that instructs the power control device 330 to cut off or maintain power supplied to the memory device 310 or the volatile memory 320 to the power control device 330.

The above-described storage device 300 and the components included in the storage device 300 may be implemented in various ways.

For example, the storage device 300 may be the storage device 100 illustrated in FIG. 1. In this case, the memory device 310 is the memory 110 illustrated in FIG. 1, the volatile memory 320 is the working memory 125 illustrated in FIG. 1, and the processing circuit 340 is the processor 124 illustrated in FIG. 1. In addition, the storage device 300 may receive a command from the host HOST through the host interface 121 described in FIG. 1.

Figure 4:
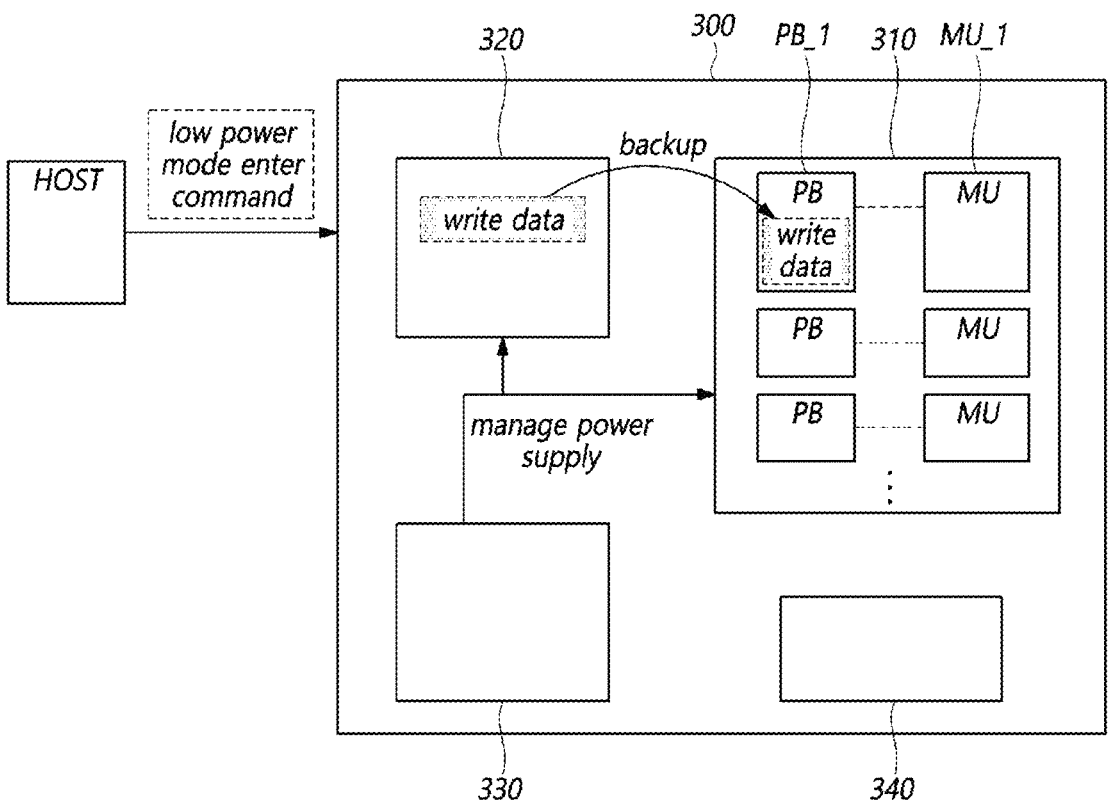
FIG. 4 is a diagram illustrating an example of the operation in which a storage device enters a low power mode based on an embodiment of the disclosed technology.

FIG. 4 is a diagram illustrating an example of the operation in which a storage device 300 enters low power mode based on an embodiment of the disclosed technology.

Referring to FIG. 4, the storage device 300 may receive a low power mode entry command from the host HOST.

The storage device 300 may enter a low power mode in response to the low power mode entry command received from the host HOST, and the host HOST does not transmit a read command or a write command to the storage device 300 until it transmits a low power mode exit command.

In some embodiments, in response to a low power mode entry command transmitted from the host (HOST), the processing circuit 340 of the storage device 300 may back up write data by transferring the write data stored in the volatile memory 320 to one or more of the plurality of page buffers PB. For example, in response to a low power mode entry command transmitted from the host (HOST), the processing circuit 340 of the storage device 300 may back up write data in a first page buffer PB_1 of the plurality of page buffers PB.

Since the processing circuit 340 backs up the write data using the first page buffer PB_1, even if power supplied to the volatile memory 320 is cut off in the low power mode, write data can be prevented from being lost.

Additionally, since the processing circuit 340 does not use multiple memory units MU to back up the write data, the processing circuit 340 may perform a backup operation quickly, and efficiently use the storage space of the memory device 310 by preventing fragmentation of the memory device 310 during the backup process.

Since the host HOST does not transmit read commands or write commands to the storage device 300 until it transmits a low power mode exit command, the write data backed up in the first page buffer PB_1 is not damaged by the host HOST request.

In an embodiment of the disclosed technology, the first page buffer PB_1, which is used to back up data stored in the volatile memory 320, may be determined in various ways.

For example, the processing circuit 340 may determine a page buffer corresponding to a first memory unit MU_1 among the plurality of memory units MU as the first page buffer PB_1. From among the plurality of memory units MU, the first memory unit MU_1 may be a buffer to which the write data is to be written.

As another example, the processing circuit 340 may determine in advance one or more of the plurality of page buffers PB as the first page buffer PB_1.

FIG. 4 shows an example where the processing circuit 340 backs up the write data stored in the volatile memory 320 to the first page buffer PB_1.

On the other hand, the processing circuit 340 may directly back up the write data stored in the volatile memory 320 to one of the plurality of memory units MU. For example, when the size of the write data is the same as the size of the page included in the memory device 310, the processing circuit 340 may directly back up the write data to one of the plurality of memory units MU.

Figure 5:
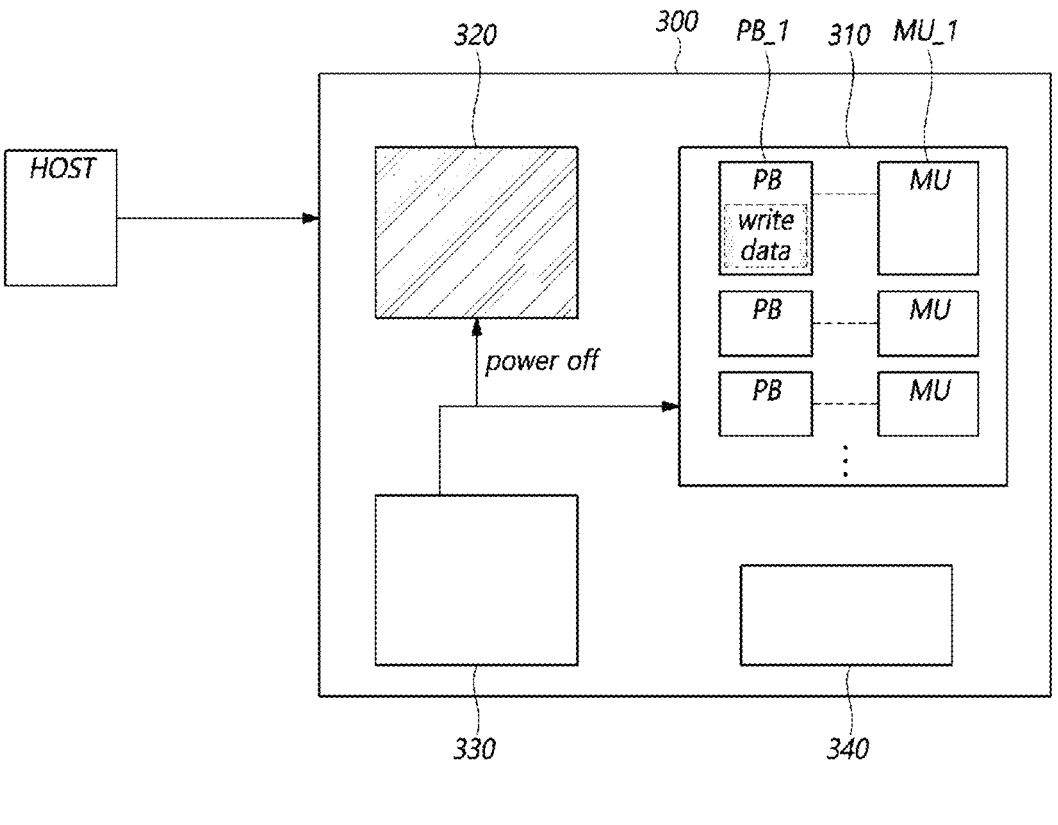
FIG. 5 is a diagram illustrating an example of the operation in which a storage device cuts off power supplied to a volatile memory based on an embodiment of the disclosed technology.

FIG. 5 is a diagram illustrating an example of the operation in which a storage device 300 cuts off power supplied to a volatile memory 320 based on an embodiment of the disclosed technology.

Referring to FIG. 5, the power control device 330 of the storage device 300 may cut off power supplied to the volatile memory 320 after the write data is backed up in the first page buffer PB_1.

In this case, the volatile memory 320 no longer consumes power, so the overall power consumption of the storage device 300 is decreased. In some implementations, when the power control device 330 of the storage device 300 may cut off power supplied to the volatile memory 320, the storage device 300 enters a low power mode. However, even when the storage device 300 enters a low power mode, power supplied to the memory device 310 may be maintained.

When, as described above, the write data stored in the volatile memory 320 is backed up, the processing circuit 340 may store meta-information indicating that the write data is backed up in the first page buffer PB_1. This is to determine whether the write data is backed up in the first page buffer PB_1 when the storage device 300 wakes up from a low power mode, and to restore the backed-up write data normally from the first page buffer PB_1 if the write data is backed up.

For example, the meta-information may include information (e.g., an address or index of the first page buffer PB_1) identifying the first page buffer PB_1 among the plurality of page buffers PB. In addition, the meta-information may further include the size information of the backed-up write data.

Hereinafter, features that are associated with the meta-information will be described in detail with reference to FIGS. 6 to 7.

Figure 6:
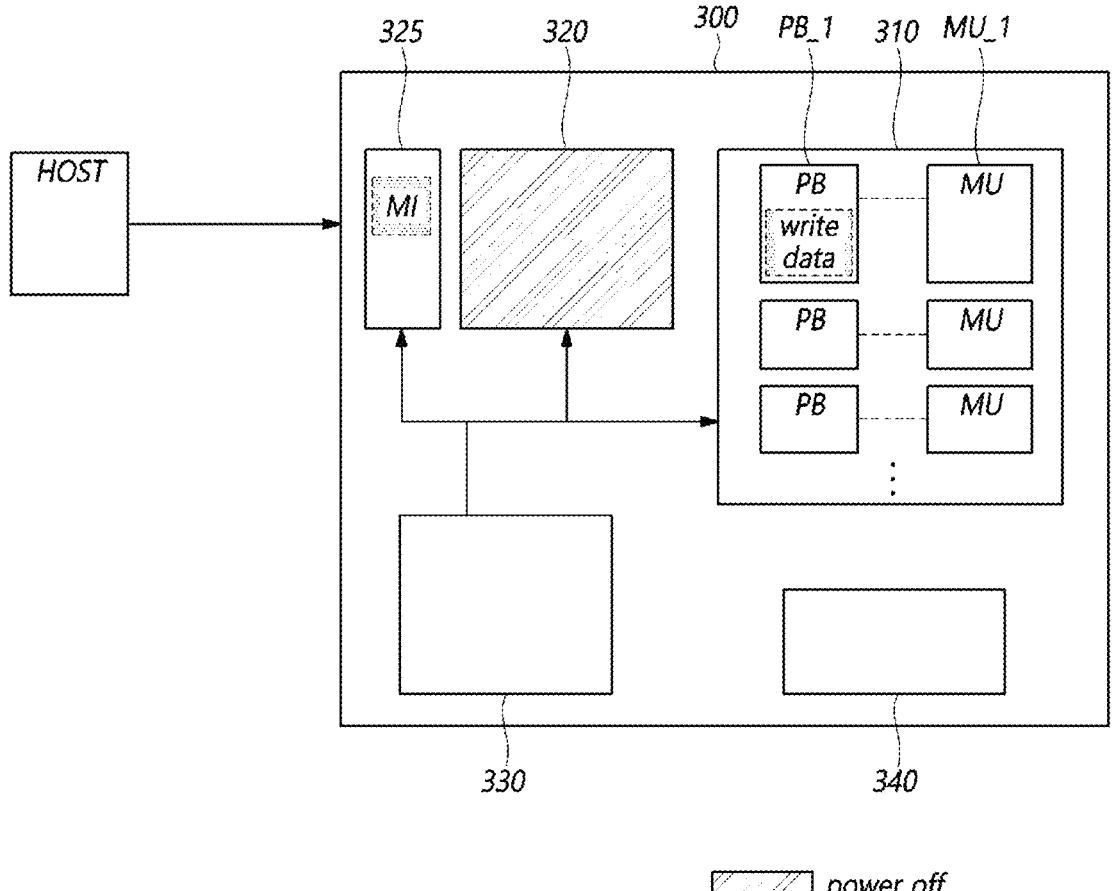
FIG. 6 is a diagram illustrating an example of the operation in which a storage device stores meta-information based on an embodiment of the disclosed technology.

FIG. 6 is a diagram illustrating an example of the operation in which a storage device 300 stores meta-information MI based on an embodiment of the disclosed technology.

Referring to FIG. 6, in some implementations, the storage device 300 may additionally include a sub-memory 325. In some embodiments, the sub-memory 325 and the volatile memory 320 may be located in separated regions of the same volatile memory chip (not shown).

The processing circuit 340 of the storage device 300 may store the above-described meta-information MI in the sub-memory 325.

In some implementations, the power control device 330 of the storage device 300 may control power supplied to the sub-memory 325. The power control device 330 may maintain power supplied to the sub-memory 325 after backing up the write data to the first page buffer PB_1.

Therefore, even if the storage device 300 enters a low power mode, the meta-information MI stored in the sub-memory 325 is not lost. Afterwards, when the storage device 300 wakes up from the low power mode, the storage device 300 may restore the write data backed up in the first page buffer PB_1 based on the meta-information MI stored in the sub-memory 325.

Figure 7:
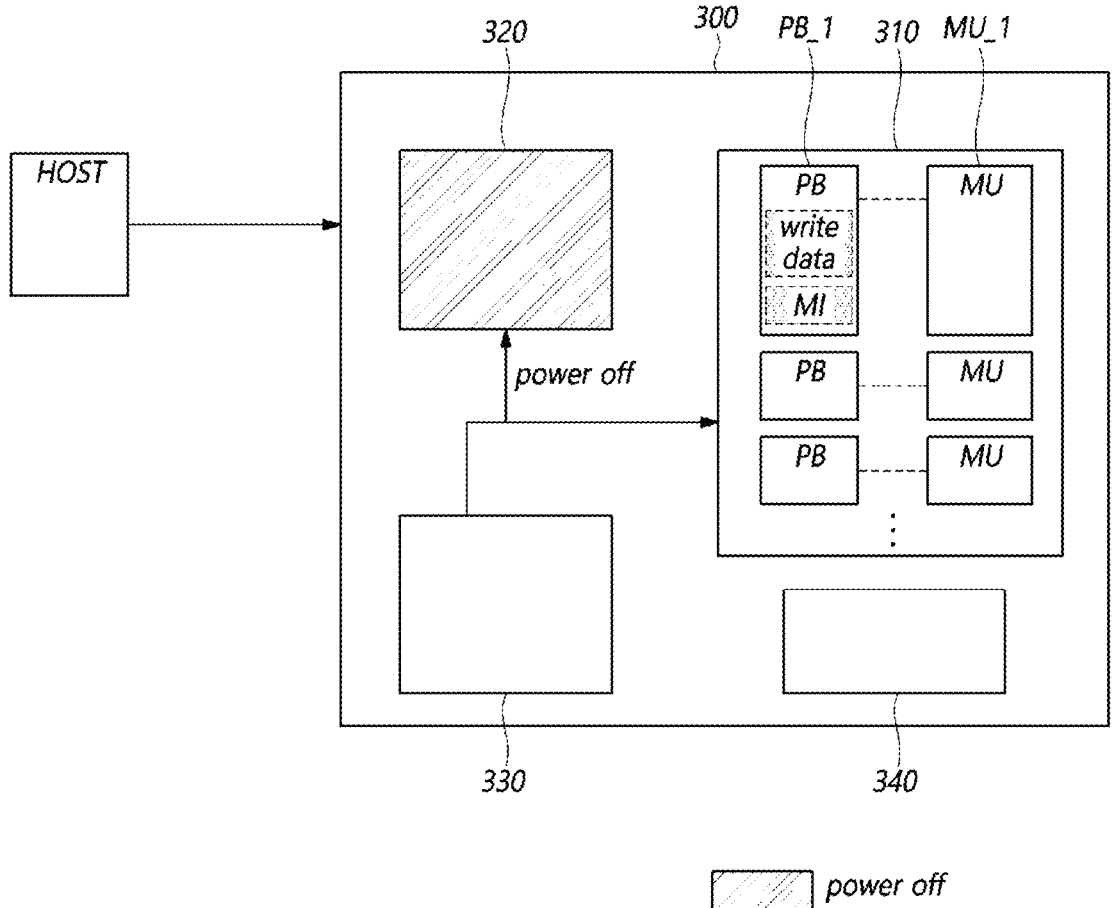
FIG. 7 is a diagram illustrating another example of the operation in which a storage device stores meta-information based on an embodiment of the disclosed technology.

FIG. 7 is a diagram illustrating another example of the operation in which a storage device 300 stores meta-information MI based on an embodiment of the disclosed technology.

Referring to FIG. 7, in some implementations, the storage device 300 may store the above-described meta-information MI in the first page buffer PB_1. That is, the meta-information MI and the write data may be stored in the same page buffer.

The meta-information MI may be stored in a predetermined location in the first page buffer PB_1. When the storage device 300 wakes up from a low power mode, the storage device 300 may determine whether the meta-information MI is stored in the predetermined location of the first page buffer PB_1, and determine whether the write data is backed up in the first page buffer PB_1.

As discussed above, in some implementations, the write data stored in the volatile memory 320 is backed up when the storage device 300 enters a low power mode.

Hereinafter, an operation in which the storage device 300 restores backed up data when the storage device 300 exits the low power mode will be described.

Figure 8:
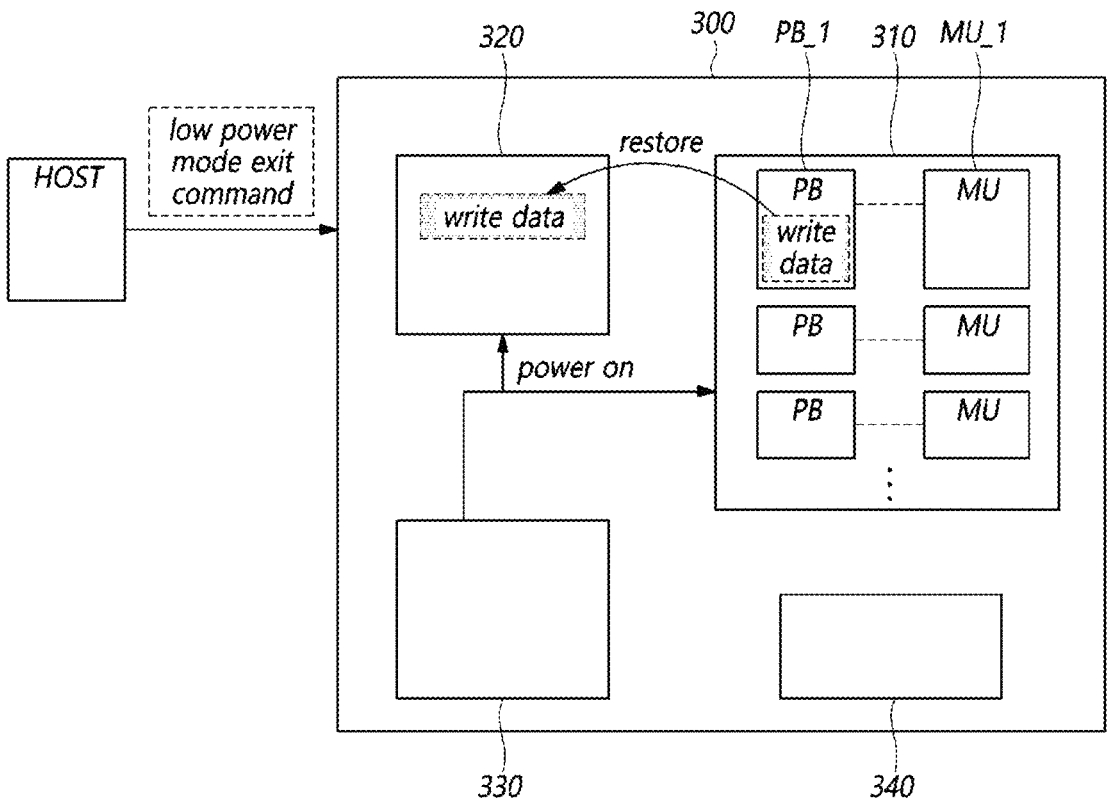
FIG. 8 is a diagram illustrating an example of the operation in which a storage device exits low power mode based on an embodiment of the disclosed technology.

FIG. 8 is a diagram illustrating an operation in which a storage device 300 exits low power mode based on an embodiment of the disclosed technology.

Referring to FIG. 8, the storage device 300 may receive a low power mode exit command from the host HOST. In response to the low power mode exit command, the storage device 300 may wake up from the low power mode, and the host HOST may transmit a read command or a write command to the storage device 300 after transmitting the low power mode exit command.

The processing circuit 340 of the storage device 300 may restore the backed-up write data to the volatile memory 320 in response to the low power mode exit command transmitted from the host HOST.

In this case, since the plurality of memory units MU of the memory device 310 are not accessed to restore the backed-up write data to the volatile memory 320, the storage device 300 may restore the backed-up write data to the volatile memory 320 quickly and efficiently, and thus an operation to exit from the low power mode is performed quickly.

In some implementations, the power control device 330 of the storage device 300 may resume power supply to the volatile memory 320 before restoring the write data backed up in the first page buffer PB_1 to the volatile memory 320. In this way, power supply to the volatile memory 320 may be resumed.

Figure 9:
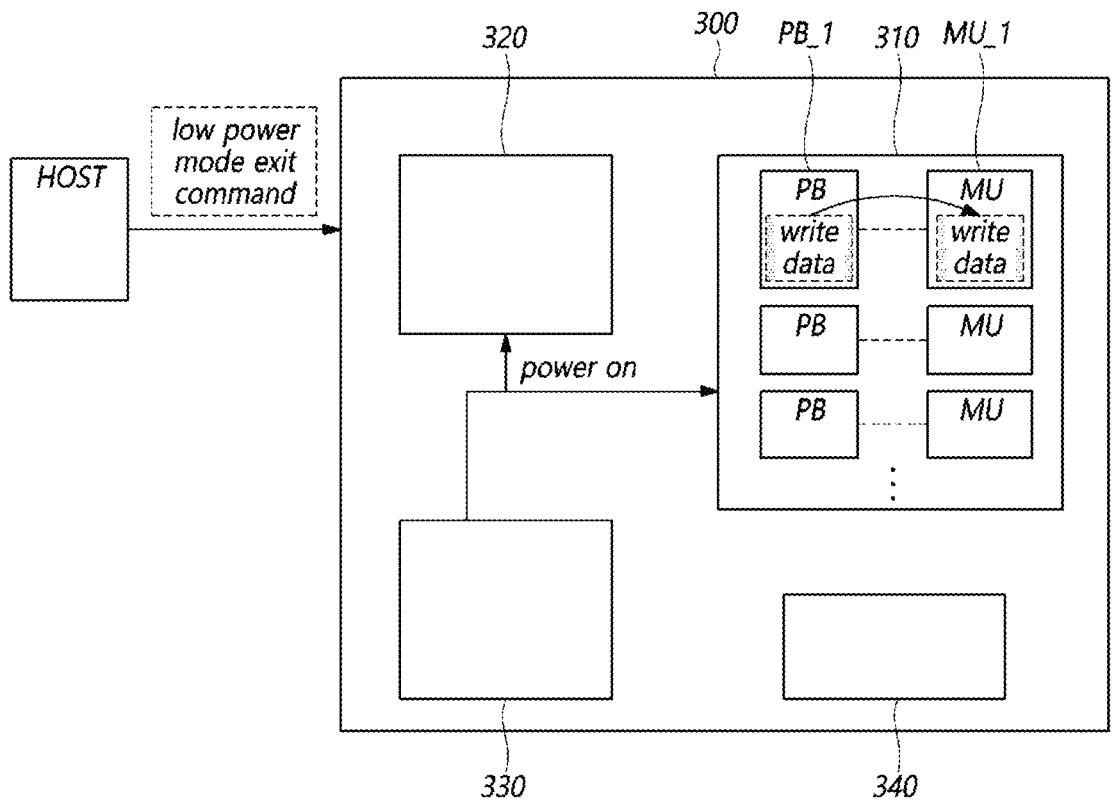
FIG. 9 is a diagram illustrating another operation in which a storage device exits low power mode based on an embodiment of the disclosed technology.

FIG. 9 is a diagram illustrating another example of the operation in which a storage device 300 exits low power mode based on an embodiment of the disclosed technology.

Referring to FIG. 9, similar to FIG. 8, the storage device 300 may receive a low power mode exit command from the host HOST.

In this case, in response to the low power mode exit command transmitted from the host HOST, the processing circuit 340 of the storage device 300 may control the memory device 310 to write the write data backed up in the first page buffer PB_1 to the first memory unit MU_1, among the plurality of memory units MU, corresponding to the first page buffer PB_1.

Figure 10:
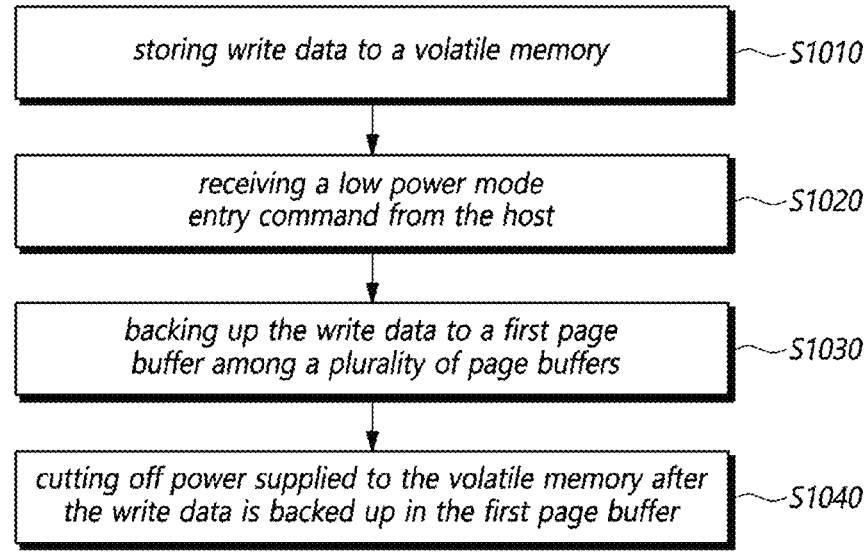
FIG. 10 is a flowchart illustrating an example operating method of a storage device based on an embodiment of the disclosed technology.

FIG. 10 is a flowchart illustrating an example method of operating a storage device 300 based on an embodiment of the disclosed technology.

Referring to FIG. 10, the operating method of the storage device 300 may include, at S1010, storing the write data, which is requested to be written by the host HOST, to the volatile memory 320.

At S1020, the operating method of the storage device 300 may include receiving the low power mode entry command from the host HOST.

At S1030, the operating method of the storage device 300 may include, in response to the low power mode entry command, backing up the write data to the first page buffer PB_1 among the plurality of page buffers PB corresponding to the plurality of memory units MU, respectively.

The first page buffer PB_1 may be a page buffer corresponding to the first memory unit MU_1, among the plurality of memory units MU, to which the write data is to be written.

The operation S1030 may further include storing the meta-information indicating that the write data is backed up in the first page buffer PB_1.

For example, the meta-information is stored in the sub-memory 325. In addition, power supplied to the sub-memory 325 is maintained after backing up the write data to the first page buffer PB_1.

As another example, the meta-information is stored in the first page buffer PB_1.

In some implementations, the operating method of the storage device 300 may further include receiving the low power mode exit command from the host HOST after backing up the write data in the first page buffer PB_1; resuming power supply to the volatile memory 320 in response to the low power mode exit command; and after power supply to the volatile memory 320 is resumed, restoring the backed-up write data to the volatile memory 320 or writing the backed-up write data to the first memory unit MU_1 among the plurality of memory units MU.

In addition, the operating method of the storage device 300 may include cutting off power supplied to the volatile memory 320 after the write data is backed up in the first page buffer PB_1 (S1040).

Only a few embodiments and examples are described. Enhancements and variations of the disclosed embodiments and other embodiments can be made based on what is described and illustrated in this patent document.

What is claimed is:

1. A storage device comprising:
   a memory device including: a plurality of memory units configured to store data; and a plurality of page buffers coupled to the plurality of memory units, respectively, and configured to temporarily store the data being read from or written to the plurality of memory units;
   a volatile memory coupled to the memory device and configured to store write data requested by a host;
   a power control device coupled to the memory device and the volatile memory and configured to control power supply to the memory device and the volatile memory; and
   a processing circuit configured to control the memory device and process a command transmitted from the host;
   wherein the processing circuit is configured to back up the write data to a first page buffer among the plurality of page buffers in response to a low power mode entry command transmitted from the host,
   wherein the power control device is configured to cut off power supply to the volatile memory after the write data is backed up in the first page buffer.

2. The storage device according to claim 1,
   wherein the processing circuit is configured to determine a page buffer corresponding to a first memory unit configured to store the write data, among the plurality of memory units, as the first page buffer.

3. The storage device based on claim 1,
   wherein the processing circuit is configured to store meta-information indicating that the write data is backed up in the first page buffer.

4. The storage device according to claim 3, further comprising a sub-memory,
   wherein the processing circuit is configured to store the meta-information in the sub-memory.

5. The storage device according to claim 4,
   wherein the power control device is configured to: control power supply to the sub-memory; and maintain power supply to the sub-memory after backing up the write data to the first page buffer.

6. The storage device according to claim 3,
   wherein the processing circuit is configured to store the meta-information in the first page buffer.

7. The storage device according to claim 1,
   wherein the processing circuit is configured to restore the backed-up write data to the volatile memory in response to a low power mode exit command transmitted from the host, wherein the power control device is configured to control to resume power supply to the volatile memory before restoring the backed-up write data to the volatile memory.

8. The storage device according to claim 1,
   wherein the processing circuit is configured to control, in response to a low power mode exit command transmitted from the host, the memory device to write the backed-up write data to a first memory unit corresponding to the first page buffer among the plurality of memory units.

9. An operating method of a storage device, the operating method comprising:
   storing write data requested by a host to be written to a volatile memory;
   receiving a low power mode entry command from the host;
   in response to the low power mode entry command, backing up the write data to a first page buffer among a plurality of page buffers corresponding to a plurality of memory units, respectively; and
   cutting off power supply to the volatile memory after the write data is backed up in the first page buffer.

10. The method according to claim 9,
    wherein the first page buffer is a page buffer corresponding to a first memory unit configured to store the write data, among the plurality of memory units.

11. The method according to claim 9,
    wherein the backing up the write data further comprising:
    additionally storing meta-information indicating that the write data is backed up in the first page buffer.

12. The method according to claim 11,
    wherein the storing meta-information stores the meta-information in a sub-memory.

13. The method according to claim 12,
    wherein the storing meta-information maintains power supply to the sub-memory after backing up the write data to the first page buffer.

14. The method according to claim 11,
    wherein the storing meta-information stores the meta-information in the first page buffer.

15. The method according to claim 9, further comprising:
    receiving a low power mode exit command from the host after backing up the write data in the first page buffer;
    resuming power supply to the volatile memory in response to the low power mode exit command; and
    after power supply to the volatile memory is resumed, restoring the backed-up write data to the volatile memory or writing the backed-up write data to a first memory unit among the plurality of memory units.

16. A data storage device comprising:
    a memory device including: a plurality of memory units configured to store data; and a plurality of buffers coupled to the plurality of memory units, respectively, and configured to temporarily store the data being read from or written to the plurality of memory units;
    a volatile memory coupled to the memory device and configured to store host data transmitted upon request from a host; and
    a controller coupled to the memory device and the volatile memory and configured to process command transmitted from the host;
    wherein the controller is configured to back up, in response to a low power mode entry command transmitted from the host, the transmitted host data in the plurality of buffers.

17. The data storage device according to claim 16, further comprising:

a power control device configured to control power supply to the memory device and the volatile memory, wherein the power control device is configured to cut off power supply to the volatile memory after the transmitted host data is backed up in the plurality of buffers.

18. The data storage device according to claim 17, wherein the controller is configured to restore the host data backed up in the plurality of buffers to the volatile memory in response to a low power mode exit command transmitted from the host, wherein the power control device is configured to control to resume power supply to the volatile memory before restoring the backed-up host data to the volatile memory.

19. The data storage device according to claim 16, wherein the controller is configured to back up the transmitted host data in a first buffer among the plurality of buffers.

20. The data storage device according to claim 19, wherein the controller is configured to control the memory device to write the host data backed up in the first buffer to a first memory unit, among the plurality of memory units, corresponding to the first buffer, in response to a low power mode exit command transmitted from the host.

\*    \*    \*    \*    \*